(12) United States Patent
Li et al.

(10) Patent No.: US 9,964,729 B2
(45) Date of Patent: May 8, 2018

(54) MICRO-OPTICS ALIGNMENT AND ASSEMBLY USING NEEDLE PIN AND TEMPORARY ATTACHMENT

(71) Applicant: Alliance Fiber Optic Products, Inc., Sunnyvale, CA (US)

(72) Inventors: Yao Li, Newark, CA (US); Qijun Xiao, Fremont, CA (US); Andy Zhou, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 367 days.

(21) Appl. No.: 14/644,173

(22) Filed: Mar. 10, 2015

(65) Prior Publication Data

US 2016/0266345 A1    Sep. 15, 2016

(51) Int. Cl.
*B29C 65/48*    (2006.01)
*G02B 7/00*    (2006.01)

(52) U.S. Cl.
CPC .................... *G02B 7/003* (2013.01)

(58) Field of Classification Search
CPC ...... G02B 7/003; G02B 7/1822; G02B 7/004; G02B 7/005; B29C 65/48; B29C 66/863; B29C 2945/76317; B29C 65/7802

USPC ...... 156/64, 923; 385/51, 80, 91, 97; 65/405
See application file for complete search history.

(56) References Cited

U.S. PATENT DOCUMENTS

| 4,724,030 A | 2/1988 | Kurtz |
| 4,829,665 A | 5/1989 | Kabeshita et al. |
| 5,458,387 A | 10/1995 | Conway et al. |
| 2013/0265645 A1* | 10/2013 | Izaki ................ G02B 5/08 359/615 |

OTHER PUBLICATIONS

English Translation of TW105125800 Search Report dated Jul. 4, 2017, Taiwan Patent Office.

* cited by examiner

*Primary Examiner* — George Koch
(74) *Attorney, Agent, or Firm* — Robert L. Branham

(57) ABSTRACT

Techniques for micro-optics alignment and assembly are described. By attaching a needle pin to an optical component to be assembled, the optical component can be placed and aligned within a limited space. After the aligned optical component is permanently bonded to a substrate or to another component, the needle pin is detached from the component. This technique allows a user to place and align a small optical component to a right position.

17 Claims, 6 Drawing Sheets

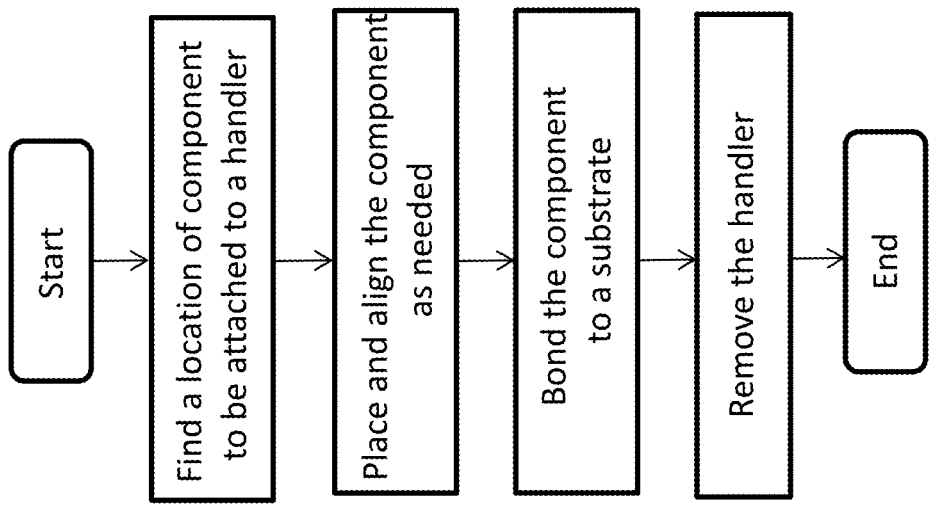

MICRO-OPTICS ALIGNMENT AND ASSEMBLY USING NEEDLE PIN AND TEMPORARY ATTACHMENT

BACKGROUND OF THE INVENTION

Field of the Invention

The invention is generally related to the area of optical communications. In particular, the present invention is related to.

The Background of Related Art

The alignment procedure is an important step in the process chain of assembling micro-optical components. It has a direct impact on the device performance of a micro-optical system, the necessary assembly time and the manufacturing costs. For that reason, only alignment procedures that are adapted to the special requirements of each assembly task will be able to save costs and attain the best optical system performance.

Conventionally, optical components in a free space device are held by tweezers or vacuum tweezers manually or with stage extension arms. With the sizes of optical components becoming smaller and smaller, these holding tools could handle them properly. The sizes of some optical components go down to the order of millimeters (e.g., 2.5×2.5 mm), even sub-millimeters, the tips of the tweezers or the mouths of the vacuum tweezers are often larger than the cross sections of the optical components.

Even more, many optical surfaces cannot be touched to avoid possible damage or scratch there to as well as for the purpose of optical alignment, the holding area of an optical component is further constrained. Therefore, a new methodology of holding optical components is required. That holding tools must neither block the optical light path nor damage/scratch the optical surfaces.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to techniques for micro-optics alignment and assembly. By attaching a needle pin to an optical component to be assembled, the optical component can be placed and aligned within a limited space. After the aligned optical component is permanently bonded to a substrate or to another component, the needle pin is detached from the component. This technique allows a user to place and align a small optical component to a right position.

According to another aspect of the present invention, the needle pin is a needle on a mechanical extension arm on a multi-dimensional translation stage that is manually or automatically actuated.

According to still another aspect of the present invention, to execute optical alignment in 6 degrees of freedom, an optical component is temporarily mounted to the needle pin by adhesive and its positions in XYZ are controllable and adjustable by a 3D translation stage that connects the needle pin with an extension arm. The angular alignments are executed by rotation stages and goniometers.

According to one embodiment, the present invention is a method for micro-optics alignment and assembly, the method comprises: determining a location of an optical component, where a tip of a needle pin is attached thereto; moving the optical component near a location predefined to accommodate the optical component permanently; aligning the optical component with respect to another component; bonding the optical component to the location permanently with a type of adhesive; and detaching the needle pin from the optical component that has already been bonded to the location.

According to another embodiment, the present invention is a method for micro-optics alignment and assembly, the method comprises: determining at least two locations of an optical component, where respective tips of at least two needle pins can be respectively attached thereto; moving the optical component near a location predefined to accommodate the optical component permanently by holding the at least two needle pins so that movement of the optical component is limited; aligning the optical component with respect to another component; bonding the optical component to the location permanently with a type of adhesive; and detaching the at least two needle pins from the optical component that has already been bonded to the location.

One of the objects, features, advantages of the present invention is to provide techniques for micro-optics alignment and assembly.

Other objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

FIG. 6 shows a process or flowchart of installing an optical component.

DETAILED DESCRIPTION OF THE PREFERRED EMBODIMENT

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
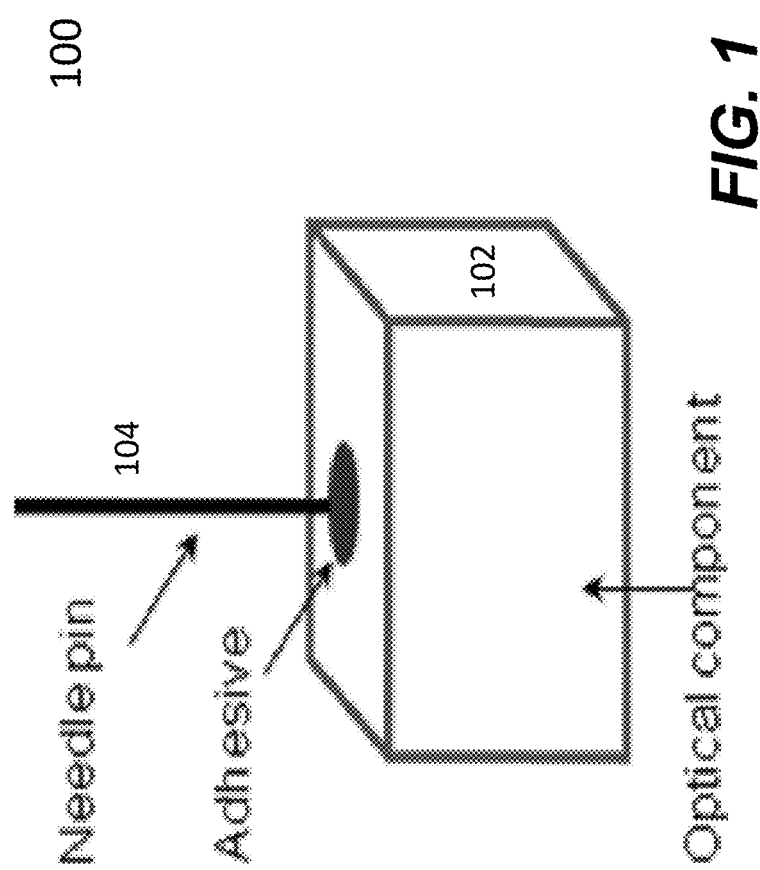
FIG. 1 shows a configuration according to one embodiment of the present invention.

Referring now to the drawings, in which like numerals refer to like parts throughout the several views. FIG. 1 shows a configuration 100 according to one embodiment of the present invention. It is assumed that an optical component 102 is to be placed onto a substrate (not shown in FIG. 1). The optical component 102 can be a mirror, a filter, a prism, or a lens, et.al. and has at least one side that can be attached to a handler 104. Because of the physical size, the handler 104 appears to be a needle pin. According to one embodiment, the optical component 102 is attached to the needle pin 104 by a type of adhesive, where the needle pin 104 is removable from the optical component 102 under a certain condition (e.g., heat or pressure).

In operation, the needle tip of the needle pin 104 can be temporarily adhered to a top surface of the optical component 102 through glue, epoxy or solder which can be removed after the optical component is aligned and fixed to the substrate or another component.

Once the needle pin 104 and the optical component 102 are temporarily integrated together, a user can hold the needle pin 104 and move the optical component 102 onto the substrate and then perform an alignment process by moving the needle pin 104 in six degrees of freedom, three in translation along XYZ axes and 3 in angular rotations around X, Y or Z axis. In one embodiment, the needle pin based aligner 102 has a needle on a mechanical extension arm that is on a multi-dimensional translation stage that is manually or automatically actuated.

In order to execute optical alignment in 6 degrees of freedom, an optical component is temporarily mounted to the needle pin by adhesive and its positions in XYZ are controllable and adjustable by a 3D translation stage that connects the needle pin with an extension arm. The angular alignments are executed by rotation stages and goniometers. After positioning the component at its proper position, the component is bonded permanently by glue or sold its bottom onto a substrate. Then the needle pin is removed under a predefined condition (e.g., heat, special light or pressure).

Figure 2:
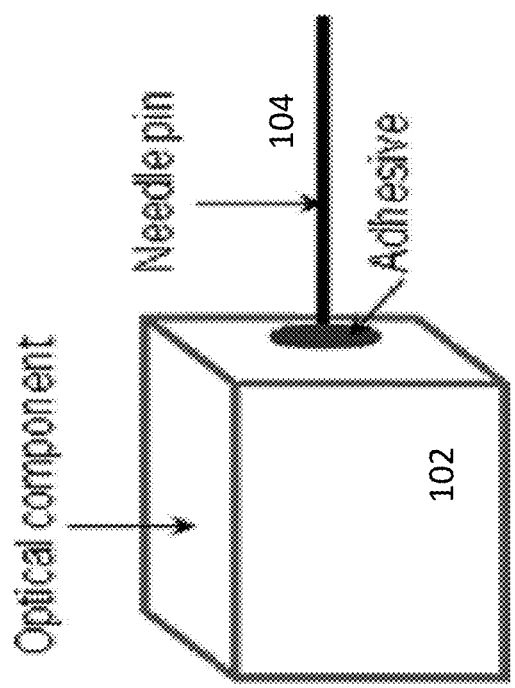
FIG. 2 shows an embodiment of side holding, in which a needle pin is bonded temporarily on one side of the component.

Due to the limitations in an available space, an optical surface of the component, and an optical path that cannot be blocked by the needle pin when performing an alignment, only certain surfaces of a component may be used for holding purpose. FIG. 2 shows an embodiment of side holding, in which a needle pin is bonded on one side of the component 102.

Figure 3:
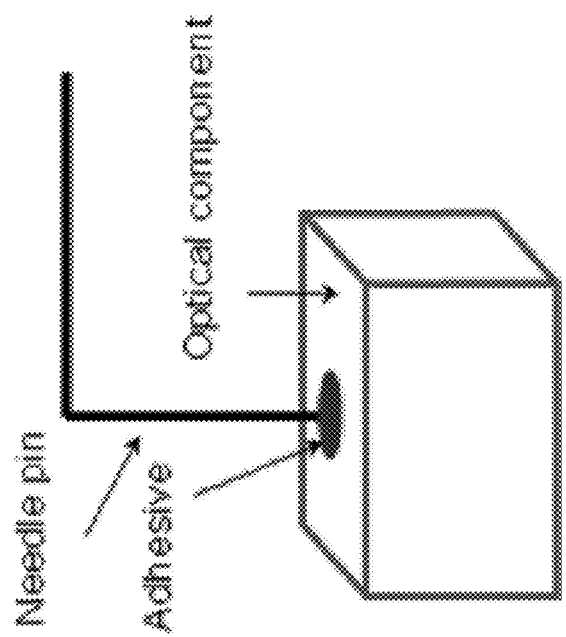
FIG. 3 shows an optical component held by a bended needle pin.
Figure 4:
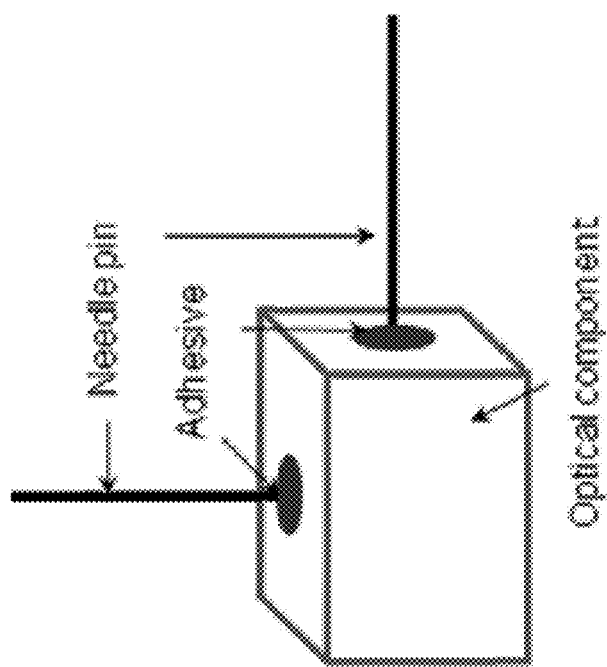
FIG. 4 shows another embodiment that uses two of the needle pins, where the two needle-pin solution can provide some rotations for optical component along a special axis by actuators (not shown)

According to one embodiment, the needle pin is bended or curved perhaps with multiple turns instead a straight one to fit the geometry of alignment fixation. FIG. 3 shows an optical component held by a bended needle pin. FIG. 4 shows another embodiment that uses two of the needle pins. The two needle-pin solution can provide some rotations for optical component along a special axis by actuators (not shown).

Figure 5:
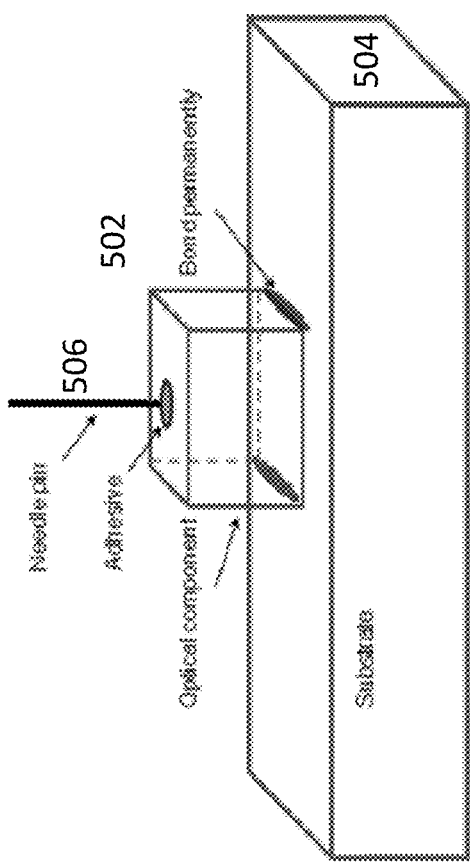
FIG. 5 shows that an optical component is bonded on a substrate permanently and a needle pin is then detached.

After the optical alignment of an optical component is aligned and bonded onto a substrate permanently. The temporary bonding between the needle pin and the component needs to be detached under a predefined condition (e.g., thermal or pressure method). In general, the bonding between the needle pin and the component is relatively weak. Therefore the temporary bonding force is much weaker than the permanent bonding force so that during and after the detachment, neither the needle pin should be damaged nor the component is moved. FIG. 5 shows an optical component 502 is bonded on a substrate 504 permanently and a needle pin 506 is then detached.

FIG. 6 shows a process or flowchart 600 of installing an optical component. The process 600 may be better understood in conjunction with the previous drawings.

At 602, it is assumed that there is a substrate on which various optical components after proper alignments are to be boned thereon. According to one embodiment, the components are small and sequentially placed on the substrate. Initially, it is relatively easy to place some of the components on the substrate because the space is relatively large compared to the size of the components. When the space is relatively large, a needle pin is chosen, a component is attached to the needle pin, in which case, the needle pin is a straight one. When the space is relatively small as more components have already been placed on the substrate, a curved needle pin is chosen. In any case, the exact location of the component that the needle pin cab be attached thereto is carefully determined. When the needle pin is attached to the component, the needle pin should not block or affect the alignment process when the component is placed for alignment with another component, often within a limited space. According to one embodiment, the curved needle pin is curved in a way that it would allow a user to move the component to its right place and facilitate an alignment thereof within a limited space.

Regardless what needle pin is used, at 604, the user or a machine employed places the component near its destination (e.g., the substrate or another component) and performs the alignment, essentially aligning the component with one or more other components. Typically, when aligning the components, a light beam is injected or used so that the light beam impinges upon one component, for example, that filters, tapes or reflects and process the light beam. One or more instruments may be employed to measure the processed light beam.

At 606, the aligned component is bonded to the substrate or another component permanently with a type of adhesive (e.g., epoxy) or sold. Once the component is fixed, the needle pin is removed at 608. Depending on what material is used to attach the component to the needle pin, a process is initiated to detach the needle pin from the fixed component without affecting the bonding of the component to the substrate or another component.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. A method for aligning an optical component with respect to a substrate or another component, the method comprising:
    determining an attachment location on a surface of the optical component;
    attaching a tip of a needle pin to the attachment location on the surface of the optical component;
    using the needle pin to move and align the optical component with respect to the substrate or the other component;
    bonding the optical component to the substrate or the other component with an adhesive; and detaching the needle pin from the attachment location on the optical component after the optical component is bonded to the substrate or the other component.

2. The method as recited in claim 1, wherein the attachment location on the optical component is on a surface of the optical component that a light beam to be processed by the optical component would not impinge.

3. The method as recited in claim 1, wherein the needle pin is used to move and align the optical component in six degrees of freedom.

4. The method as recited in claim 1, wherein the needle pin is one of being straight and curved.

5. The method as recited in claim 1, wherein the needle pin is controlled and adjusted by a multi-dimensional translation stage that connects the needle pin with an extension arm.

6. The method as recited in claim 1, wherein angular alignments of the optical component with respect to the substrate or the other component are executed by rotation stages and goniometers.

7. The method as recited in claim 1, wherein the needle pin is detached from the attachment location without causing damage to the optical component.

8. The method as recited in claim 7, wherein the needle pin is detached from the attachment location under light, pressure, or heat.

9. The method as recited in claim 1, wherein the attachment location is an upper surface of the optical component.

10. The method as recited in claim 1, wherein the attachment location is on a side of the optical component.

11. The method as recited in claim 1, wherein the optical component is a mirror, a filter, a prism, or a lens.

12. A method for aligning an optical component with respect to a substrate or another component, the method comprising:
    determining at least two attachment locations on respective surfaces of the optical component;
    attaching respective tips of at least two needle pins to the attachment locations on the optical component;
    using the needle pins to move and align the optical component with respect to the substrate or the other component;
    bonding the optical component to the substrate or the other component with an adhesive; and
    detaching the at least two needle pins from the attachment locations on the optical component after the optical component is bonded to the substrate or the other component.

13. The method as recited in claim 12, wherein the needle pins are straight or curved.

14. The method as recited in claim 12, wherein each of the at least two needle pins is a needle on a mechanical extension arm on a multi-dimensional translation stage that is manually or automatically actuated.

15. The method as recited in claim 12, wherein angular alignments of the optical component with respect to the substrate or the other component are executed by rotation stages and goniometers.

16. The method as recited in claim 12, wherein the at least two needle pins are detached from the attachment location on the optical component without causing damage to the optical component.

17. The method as recited in claim 16, wherein each of the at least two needle pins are detached from the optical component under light, pressure, or heat.

* * * * *